United States Patent
Mende

(10) Patent No.: US 11,448,743 B2
(45) Date of Patent: Sep. 20, 2022

(54) METHOD FOR DETERMINING THE DISTANCE AND SPEED OF AN OBJECT

(71) Applicant: S.M.S. SMART MICROWAVE SENSORS GMBH, Braunschweig (DE)

(72) Inventor: Ralph Mende, Braunschweig (DE)

(73) Assignee: S.M.S. SMART MICROWAVE SENSORS GMBH, Braunschweig (DE)

(*) Notice: Subject to any disclaimer, the term of this patent is extended or adjusted under 35 U.S.C. 154(b) by 217 days.

(21) Appl. No.: 16/494,576

(22) PCT Filed: Jan. 15, 2018

(86) PCT No.: PCT/EP2018/050858
§ 371 (c)(1),
(2) Date: Sep. 16, 2019

(87) PCT Pub. No.: WO2018/166668
PCT Pub. Date: Sep. 20, 2018

(65) Prior Publication Data
US 2020/0191935 A1 Jun. 18, 2020

(30) Foreign Application Priority Data
Mar. 17, 2017 (DE) .................. 10 2017 105 783.8

(51) Int. Cl.
*G01S 13/34* (2006.01)
*G01S 13/536* (2006.01)
*G01S 7/35* (2006.01)

(52) U.S. Cl.
CPC .......... *G01S 13/347* (2013.01); *G01S 13/536* (2013.01); *G01S 7/356* (2021.05)

(58) Field of Classification Search
CPC .... G01S 13/343; G01S 13/344; G01S 13/345; G01S 13/346; G01S 13/347; G01S 13/536; G01S 7/356
(Continued)

(56) References Cited

U.S. PATENT DOCUMENTS 3,403,394 A * 9/1968 Rouault .................. G01S 13/24
343/756
3,913,106 A * 10/1975 Sato ........................ G01S 13/60
342/84

(Continued)

FOREIGN PATENT DOCUMENTS

DE 10 2006 032539 A1 1/2008
DE 102006032539 A1 1/2008
(Continued)

OTHER PUBLICATIONS

JP Office Action, 2019-537384, dated Feb. 16, 2021.
(Continued)

*Primary Examiner* — Erin F Heard
*Assistant Examiner* — Michael W Justice
(74) *Attorney, Agent, or Firm* — WCF IP

(57) ABSTRACT

The invention relates to a method for determining the distance and radial speed of an object relative to a measuring point, wherein the method comprises the following steps:
a) emitting first transmission signals, which are radar radiation in the form of first frequency ramps,
b) emitting second transmission signals, which are radar radiation in the form of second frequency ramps, wherein the second frequency ramps are different to the first frequency ramps,
c) receiving received signals, which are first and second transmission signals reflected at the object,
d) mixing the received signals with the first or second transmission signals to create mixed signals,
(Continued)

Figure 1:
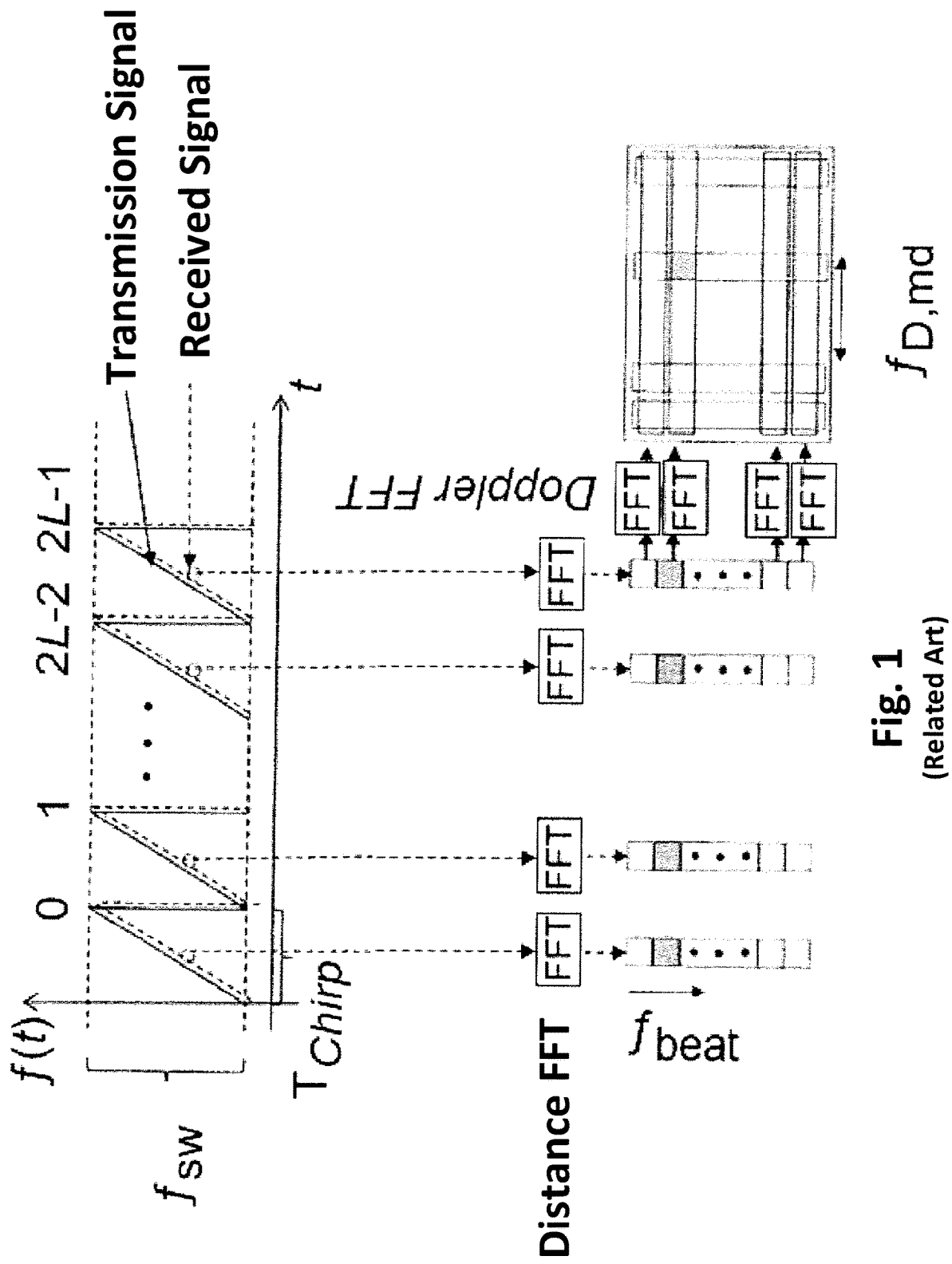

e) creating a range-Doppler matrix using the mixed signals,
f) detecting two Doppler frequencies, which originate from the radial speed of the object, and
g) evaluating the Doppler frequencies and/or phase information of the mixed signals, such that ambiguities are eliminated when determining the radial speed wherein the first transmission signals and the second transmission signals are emitted at the same time.

14 Claims, 9 Drawing Sheets

(58) Field of Classification Search
USPC .................................. 342/200, 128, 192, 196
See application file for complete search history.

(56) References Cited

U.S. PATENT DOCUMENTS

| | | | | |
|---|---|---|---|---|
| 3,981,013 | A * | 9/1976 | Christensen | G01S 7/36 |
| | | | | 342/131 |
| 4,388,622 | A * | 6/1983 | Fletcher, Jr. | G01S 13/343 |
| | | | | 342/112 |
| 4,717,916 | A * | 1/1988 | Adams | G01S 13/4454 |
| | | | | 342/107 |
| 5,225,840 | A * | 7/1993 | Hsu | G01S 7/282 |
| | | | | 455/76 |
| 6,563,454 | B2 | 5/2003 | Akasu | |
| 7,094,204 | B2 * | 8/2006 | Banjanin | G01S 7/52047 |
| | | | | 600/443 |
| 7,095,362 | B2 * | 8/2006 | Hoetzel | G01S 13/931 |
| | | | | 342/84 |
| 7,629,919 | B2 * | 12/2009 | Wilcox | G01S 13/767 |
| | | | | 342/135 |
| 7,808,424 | B2 * | 10/2010 | Wilcox | G01S 13/825 |
| | | | | 342/135 |
| 10,101,438 | B2 * | 10/2018 | Subburaj | G01S 13/88 |
| 10,520,583 | B2 * | 12/2019 | Bialer | H03L 7/08 |
| 10,680,863 | B2 * | 6/2020 | Spalink | G01S 13/583 |
| 10,809,353 | B2 * | 10/2020 | Subburaj | G01S 13/88 |
| 2004/0039283 | A1 * | 2/2004 | Banjanin | G01S 7/52047 |
| | | | | 600/437 |
| 2005/0225476 | A1 * | 10/2005 | Hoetzel | G01S 13/24 |
| | | | | 342/135 |
| 2006/0044181 | A1 * | 3/2006 | Wilcox | G01S 13/825 |
| | | | | 342/194 |
| 2009/0189800 | A1 * | 7/2009 | Benari | G01S 7/4052 |
| | | | | 342/134 |
| 2010/0026557 | A1 * | 2/2010 | Wilcox | G01S 13/767 |
| | | | | 342/118 |
| 2011/0037642 | A1 * | 2/2011 | Stove | G01S 7/35 |
| | | | | 342/128 |
| 2012/0056779 | A1 * | 3/2012 | Freking | G01S 7/5273 |
| | | | | 342/189 |
| 2014/0049423 | A1 * | 2/2014 | De Jong | G01S 13/536 |
| | | | | 342/25 A |
| 2014/0197983 | A1 | 7/2014 | Reuter | |
| 2015/0084806 | A1 | 3/2015 | Rohling | |
| 2016/0294590 | A1 * | 10/2016 | Spalink | G01S 13/583 |
| 2018/0113192 | A1 * | 4/2018 | Bialer | G01S 7/282 |
| 2018/0306902 | A1 * | 10/2018 | Pernstål | G01S 7/40 |

FOREIGN PATENT DOCUMENTS

| | | |
|---|---|---|
| DE | 10 2011 051969 A1 | 1/2013 |
| DE | 10 2011 051971 A1 | 1/2013 |
| DE | 10 2012 008350 A1 | 10/2013 |
| DE | 10 2013 008607 A1 | 11/2014 |
| JP | 7-43453 A | 2/1992 |
| JP | 2000-235072 A | 8/2000 |
| JP | 2009-541724 A | 11/2009 |
| JP | 2015-517104 A | 6/2015 |
| WO | 2013/156012 A1 | 10/2013 |

OTHER PUBLICATIONS

Zwanetski et al.; "Waveform Design for FMCW MIMO Radar Based on Frequency Division"; IEEE 2013 14th International Radar Symposium (IRS), Aug. 16, 2013.

* cited by examiner

Reference peak (frequency shift between signal B and signal A)

METHOD FOR DETERMINING THE DISTANCE AND SPEED OF AN OBJECT

The invention relates to a method for determining the distance and radial speed of an object relative to a measuring point, wherein the method comprises the following steps:
a) emitting first transmission signals, which are radar radiation in the form of first frequency ramps,
b) emitting second transmission signals, which are radar radiation in the form of second frequency ramps, wherein the second frequency ramps are different to the first frequency ramps,
c) receiving received signals, which are first and second transmission signals reflected at the object,
d) mixing the received signals with the first or second transmission signals to create mixed signals,
e) creating a range-Doppler matrix using the mixed signals,
f) detecting two Doppler frequencies, which originate from the radial speed of the object, and
g) evaluating the Doppler frequencies and/or phase information on the mixed signals, such that ambiguities are eliminated when determining the radial speed.

The invention also relates to a device for conducting such a method.

The first transmission signals are also described as signal A and the second transmission signals as signal B.

A method of this type is described in DE 10 2012 008 350 A1, for instance.

A radar transmitter and a corresponding receiver are situated at the measuring point. It is common to use a measurement to determine the distance and radial speed of an object relative to this measuring point by means of suitably modulated radar signals. Here, different frequency ramps in the form of first and second transmission signals are emitted, said signals being nested with one another.

Previously, it was common to only modulate a transmission signal with short, rapid and identical ramps. During a cycle time with a length of 65 ms, for example, 256 such ramps, for instance, can be modulated, wherein said ramps are normally run through with increasing frequency. At the beginning of the ramp, the emitted signal thus has a starting frequency which increases with a set degree of progression until an end frequency is achieved at the end of each ramp. Each of these, for instance, 256 ramps has a length of 254 μs, for example. If each ramp is now scanned with 512 sample values, this corresponds to a sampling frequency of 2.01 MHz.

A first evaluation per ramp is then conducted in the form of a first Fast Fourier Transformation (FFT). A second FFT is conducted from ramp to ramp, i.e. with an effective sampling period of 254 μs, which corresponds to an effective sampling frequency of 3.94 kHz. The first FFT with a sampling frequency of 2.01 MHz is described as the "range FFT". The second FFT with a sampling frequency of 3.94 kHz is described as the "Doppler FFT". In this case, the example was idealized in such a way that the ramp setback times between the actual ramps was ignored.

A Doppler frequency range of 3.94 kHz corresponds to an unambiguous speed measurement range of 24.5 m/s at a carrier frequency of 24.125 GHz. 150 MHz, for instance, can be used as a frequency deviation fsw for each ramp, i.e. the difference between the end frequency and starting frequency.

As long as the radial speed of the object that is to be measured is smaller than the unambiguous measurement range of 24.5 m/s, the speed can be unambiguously determined. If the radial speed is greater, for example 40 m/s, a speed of 15.5 m/s is determined.

While the first FFT (range FFT) is conducted to ensure that for 256 ramps there are also 256 frequency spectra of the first FFT, the second FFT (Doppler FFT) is preferably carried out for each range value ("range gate"). However, it is also possible to only conduct the second FFT for selected range values. The result of the two FFTs can be presented in a range-Doppler matrix. To increase the relatively small unambiguous range of the Doppler FFT, DE 10 2012 008 350 A1 proposes alternately emitting two different frequency ramps. These differently configured frequency ramps are processed separately. As the different frequency ramps are emitted on an alternating basis, during a measurement cycle the number of respective equal frequency ramps in relation to the emission of identical ramps is reduced by half, which reduces the effective sampling frequency for the Doppler FFT and thus also the unambiguous range. However, given that the Doppler frequency to be determined depends on the carrier frequency and therefore on the type of frequency ramp emitted, two Doppler frequencies with two items of phase information can be obtained, which can be used in combination in order to considerably increase the unambiguous range of the Doppler FFT.

The disadvantage is that, for each individual type of ramp emitted, the unambiguous range of the Doppler FFT is reduced, as is the signal-to-noise ratio due to the small number of the individual ramps of one ramp type; this reduces the quality of the measured value.

The invention thus aims to improve a method according to the preamble in such a way that the unambiguous range of the Doppler FFT increases and the signal-to-noise ratio is improved at the same time.

The invention solves the problem at hand by way of a method according to the generic term in claim 1, which is characterized by the fact that the first transmission signals and the second transmission signals are emitted at the same time.

Whereas a method according to the prior art sees both frequency ramps being transmitted on an alternating basis, the invention calls for both frequency ramps to be transmitted at the same time, so the number of ramps emitted during one measuring cycle doubles. Given that both transmission signals are sent out at the same time, they are both reflected at the object that is to be detected, such that the received signals also consist of two individual signals. Nevertheless, in order to receive the mixed signals, the received signals are only mixed with one of the emitted transmission signals. These mixed signals are then subjected to two-dimensional FFT, as in the prior art, thereby generating a range-Doppler matrix.

However, given that the mixed signals in the method according to the invention are generated from received signals, which comprise two parts corresponding to the two emitted transmission signals, now two frequency peaks per object to be detected occur in the two-dimensional FFT, said frequency peaks arising from the different frequencies of the two emitted transmission signals and thus the two received signals. If the frequency offset of the two emitted transmission signals is known, these can be used to easily calculate the information on the distance of the object from the measurement location and an unambiguous Doppler frequency.

As is the case with the prior art, two Doppler frequencies are also determined, wherein said frequencies also differ slightly from one another due to the different carrier frequencies of the two transmission signals. These Doppler frequencies and/or phase information from the mixed signals are used in the usual manner to rectify the ambiguity of the Doppler FFT. Compared with the prior art, the advantage of the method according to the invention lies in the fact that the effective sampling frequency of the Doppler FFT could be doubled, thereby increasing the unambiguous range for each individual Doppler frequency on the one hand and providing a greater number of measured values for each Doppler frequency on the other, such that the signal-to-noise ratio could also be improved.

Since only one range-Doppler matrix need to be generated, the computing effort required when compared with the method from the prior art has barely increased.

Preferably, the frequency ramps are sloping frequency ramps. This means that each frequency ramp begins with the end frequency, which represents the greatest frequency of the frequency ramp, and ends at the starting frequency, which represents the smallest frequency of the frequency ramp. Of course, it is also possible to use the individual frequency ramps as ascending frequency ramps and to tune the transmission signals, starting with the smallest frequency and increasing to the greatest frequency.

In a preferred embodiment, the first frequency ramps and the second frequency ramps are parallel frequency ramps, with a frequency offset df. This means that, at any time, the emitted frequency of the two transmission signals has a difference df. A constant frequency offset simplifies the calculations that must be made. The frequency offset of the two peaks after the first range FFT contains information on the frequency offset df which, provided that it is constant and known, can be easily calculated.

In a preferred embodiment, the frequency offset df is an integer multiple of f/k, wherein k is a length of the range FFT and f the sampling frequency, with which these measured values can be recorded. The integer multiple is preferably at least 5, preferably at least 7 and at most 20, preferably at most 15.

When calculating the range-Doppler matrix, the range FFT is calculated first. With a sampling of 512 measured values (samples) per ramp, for example, a range FFT of the length 512 would have to be calculated per ramp. The calculation of the Doppler FFT is subsequently conducted per range gate. Due to a smaller unambiguous range of the range FFT, especially with single-channel sampling, the Doppler FFT is generally not calculated for all range gates. Often, only a little less than half, for instance 0.4-times, the possible number is calculated. In this case, the Doppler FFT would only be calculated for 204 of the possible 512 range gates.

Each of these range gates then corresponds to a frequency of f/k, wherein k, as previously explained, is the length of the range FFT and f the sampling frequency at which these measured values are recorded or sampled.

At a sampling frequency f of 10 MHz and with a number k of 512, this type of range gate corresponds to a frequency or range gate frequency of 19.53 kHz. An integer multiple of 5 of this frequency therefore corresponds to a frequency offset df of 97.65 kHz, a multiple of 15 corresponds to a frequency offset of df=292.95 kHz. Of course, other sampling frequencies or other numbers of measured values per ramp result in other frequencies.

The use of a small frequency offset such as this ensures that the mixed signals, which result from the mixing of the received signals with one of the two transmitted signals, are arranged in a relatively small frequency range. If a bandpass filter is used behind the mixer before the signals are processed further, this can preferably be selected in such a way that all the mixed signals are able to pass the bandpass filter, meaning that only one range-Doppler matrix need to be generated to be able to detect both frequency peaks. If the frequency offset df is too great, the mixed signals will also feature frequency components that lie correspondingly far apart from one another; as the case may be, said frequency components cannot fully pass a single bandpass filter.

In a preferred embodiment, the first transmission signals are sent out by a first transmitting antenna and the second transmission signals by a second transmitting antenna.

Alternatively, two transmitting antennae are provided, but neither any of the first transmission signals nor any of the second transmission signals are permanently allocated to said antennae. Rather, in this case, the first transmitting antenna and the second transmitting antenna preferably send out the first transmission signals and the second transmission signals on an alternating basis.

These embodiments are particularly beneficial if, alongside the distance and the radial speed, a direction in which the object is situated is also determined. To this end, it is beneficial to have an angular resolution that can be improved by using several transmitting antennae which emit different transmission signals.

Alternatively, it is of course also possible that the first transmission signals and the second transmission signals are emitted by a single transmitting antenna. This is especially beneficial if an improvement of the angular resolution is not required, as in this case the complexity of the instruments needed can be considerably reduced.

In a preferred configuration, the received signals are received by several, preferably at least four, especially preferably at least 8, receiving antennae. Given that the different receiving antennae are arranged to be spatially separated from one another, wherein they are preferably arranged equidistant from one another, the transmission signals emitted by the transmitting antennae exhibit slightly different transmission times before reaching the different receiving antennae, having already been reflected by the object. These differences in transmission time and/or the resulting phase differences can be used to extract information on the angle and therefore information on the direction in which the object is situated. Different objects can also be isolated in the angle and thus separated. The more reception channels used, the greater the separation efficiency. If at least two transmitting antennae are used at the same time, which emit either the first and second transmission signal respectively or the first and second transmission signals on an alternating basis, the skilled selection and arrangement of the individual antennae in relation to one another enables the creation of a virtual antenna array that is larger than the actual number of receiving antennae that are physically present. This method, the so-called MIMO principle, is known from the prior art, wherein the abbreviation stands for Multiple Input Multiple Output.

An example of an embodiment of the method according to the present invention, in which the first and second transmission signals are emitted by different transmitting antennae and the reflected received signals are subsequently received by a plurality of different receiving antennae, not only renders possible the improved signal-to-noise ratio that already exists according to the invention and the greater unambiguous range of the Doppler FFT, but it also allows for a very precise angular resolution and therefore a very precise determination of the direction in which the object is situated.

In a preferred configuration of the method, third and fourth transmission signals in the form of third and fourth frequency ramps are emitted at the same time, wherein first and second transmission signals and third and fourth transmission signals are emitted on an alternating basis. By way of a total of four different transmission signals, four different Doppler frequencies can be determined by the Doppler FFT; said frequencies and/or the phase information of the mixed signals can be used to further increase the unambiguous range. If third and fourth transmission signals are emitted, the resulting reflected received signals are received and mixed exclusively with the third transmission signals or the fourth transmission signals. Of course, they can also be mixed with the first or second transmission signals. Preferably, the four different transmission signals are parallel frequency ramps with different frequency offset values. Of course, four transmission signals can also be emitted at the same time. If the frequency offset values are selected to be small enough, the mixed signals which arise from such transmission signals when the received signals are received and mixed with at least one of the transmission signals can be guided through a single bandpass filter, such that, in this case too, only one range-Doppler matrix need to be generated and calculated. The third and fourth transmission signals can also be used to improve a separation efficiency in the angle, by way of which different objects can be isolated and separated.

In a preferred configuration, the third and fourth transmission signals are parallel frequency ramps, which are preferably sloping frequency ramps. Of course, they may also be designed as ascending frequency ramps.

In a preferred configuration of the method, a part of the first or second transmission signal is mixed with the respective other transmission signal, without it being emitted by a transmitting antenna. If a range-Doppler matrix is calculated using the resulting mixed signal, the mix of the two transmission signals leads to a peak, the distance of which in the direction of the range FFT corresponds exactly to the frequency offset, as no Doppler frequency is used. The frequency and/or phase information of the corresponding mixed signal can be used to obtain assertions and test measurements regarding the quality of the transmission signal generators.

Figure 2:
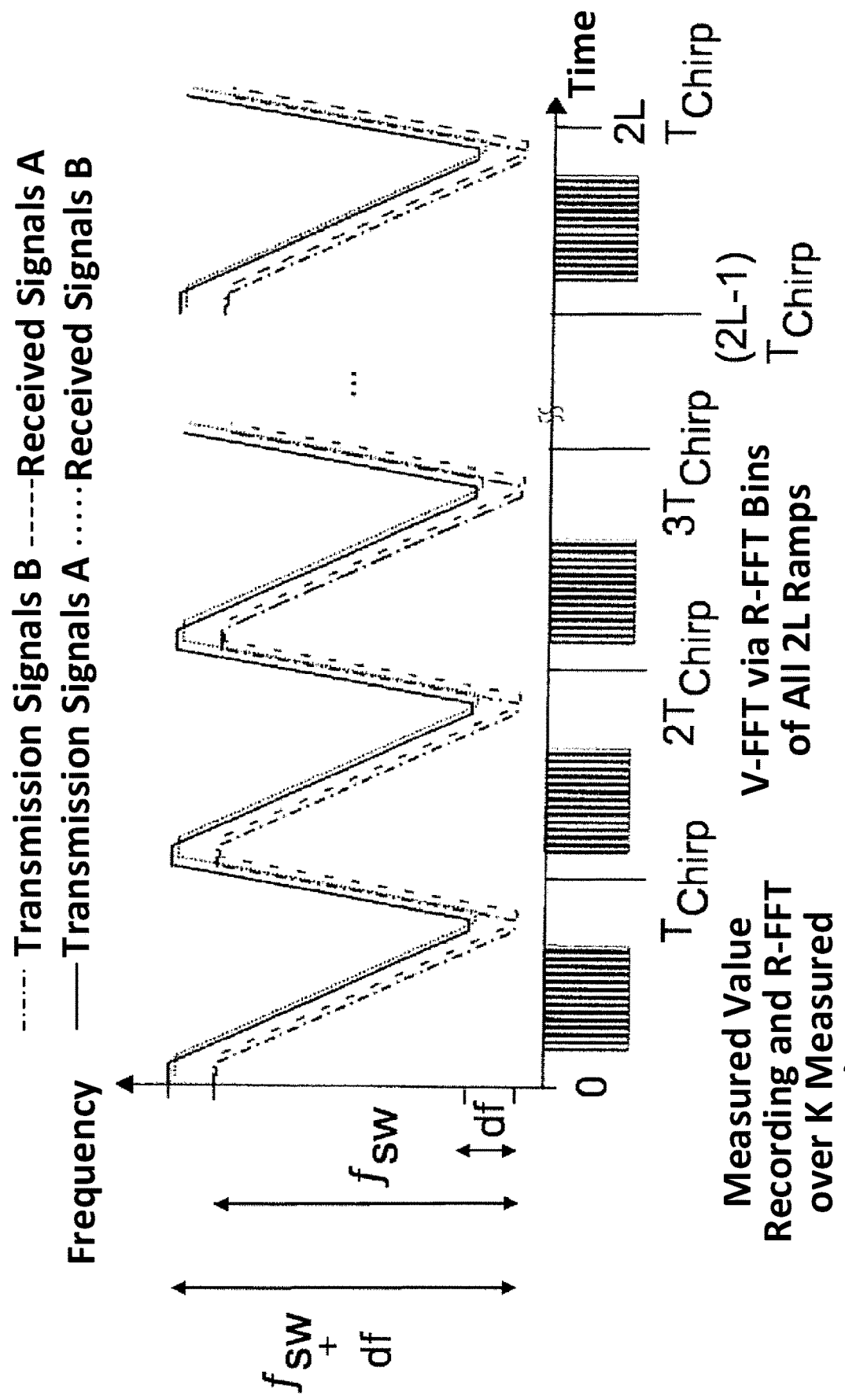
Figure 3:
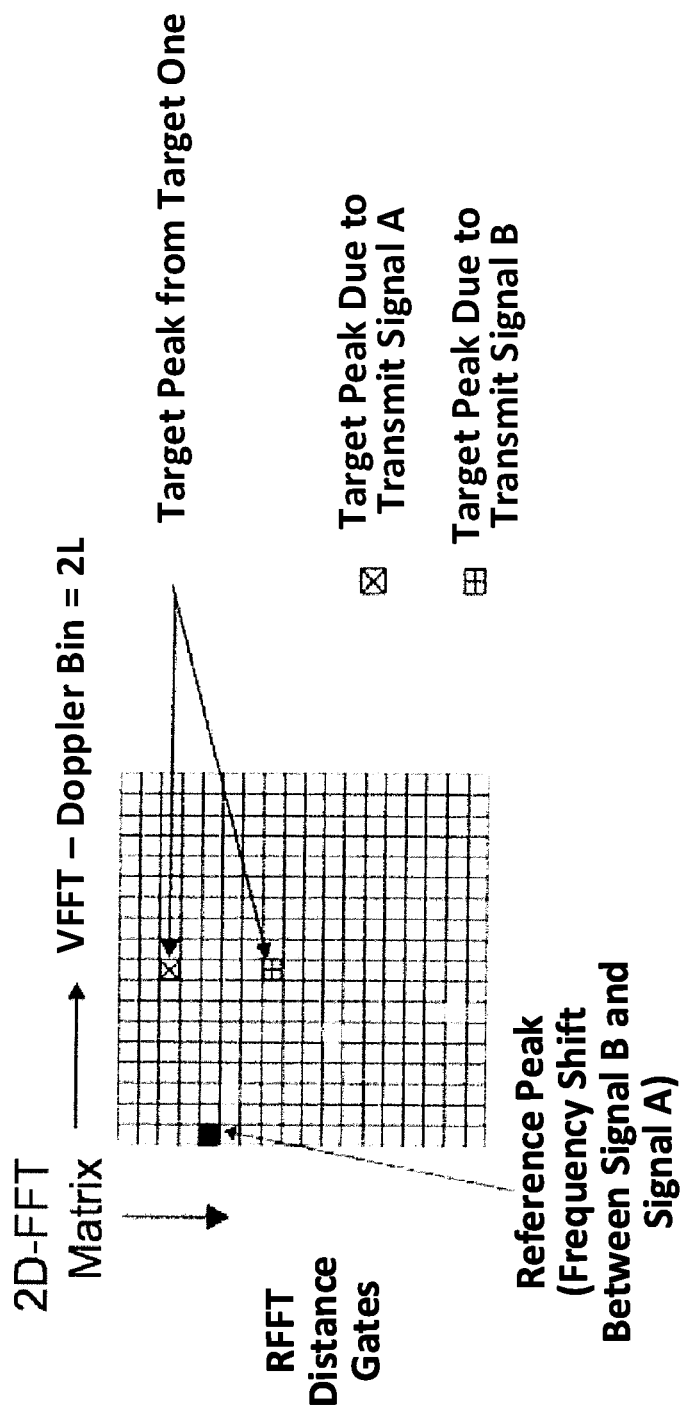
Figure 4:
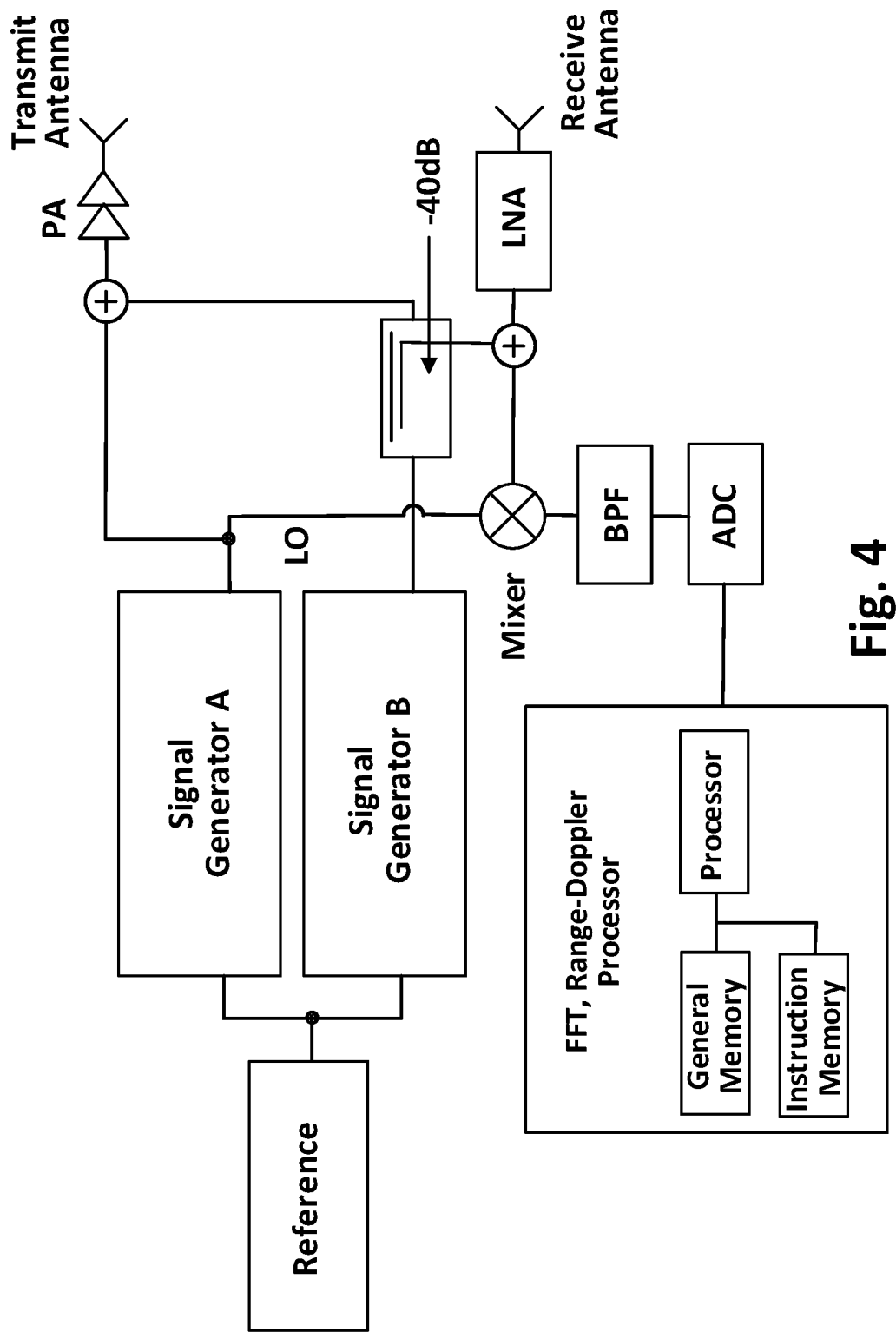
Figure 5:
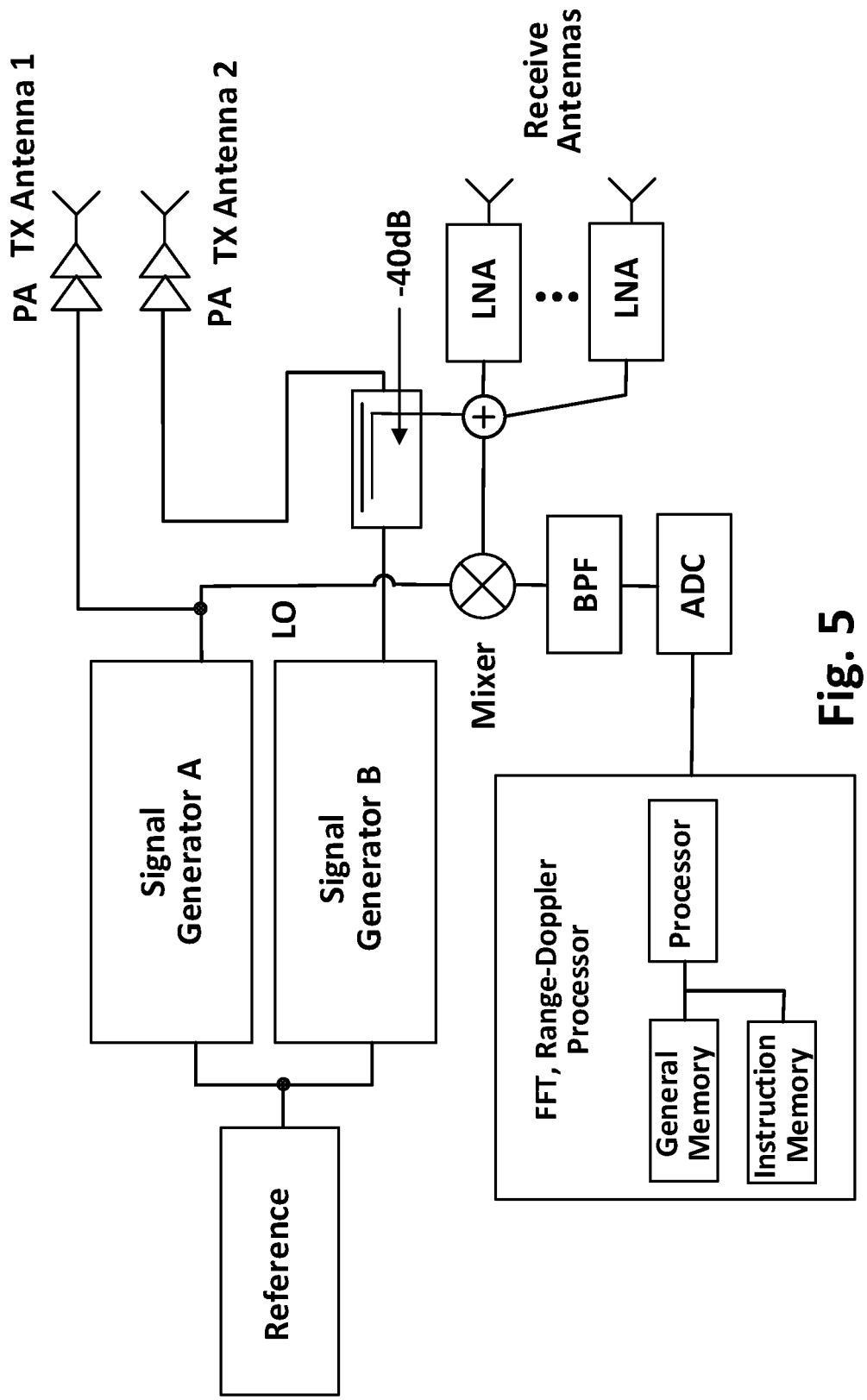
Figure 6A:
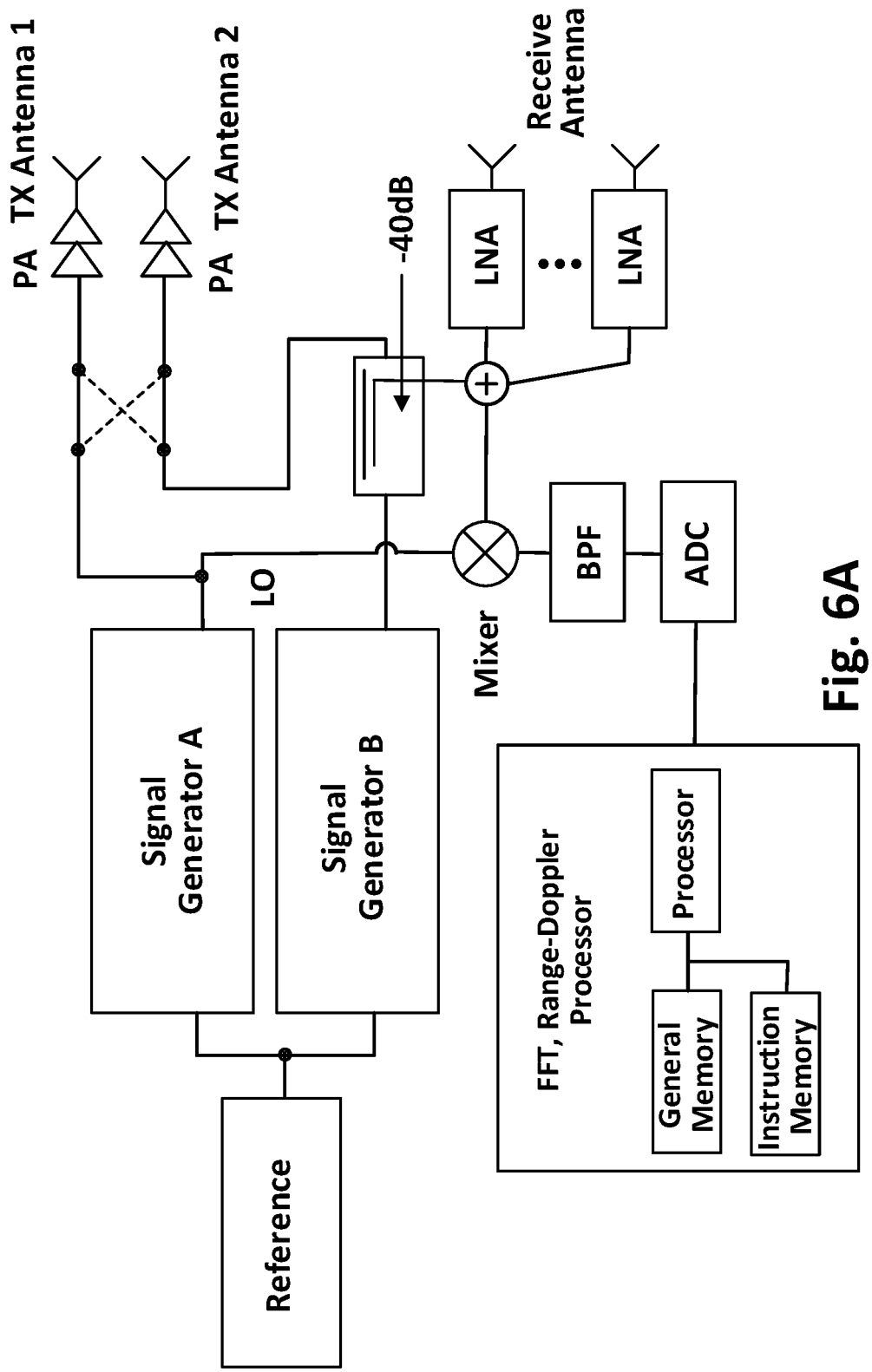
Figure 6B:
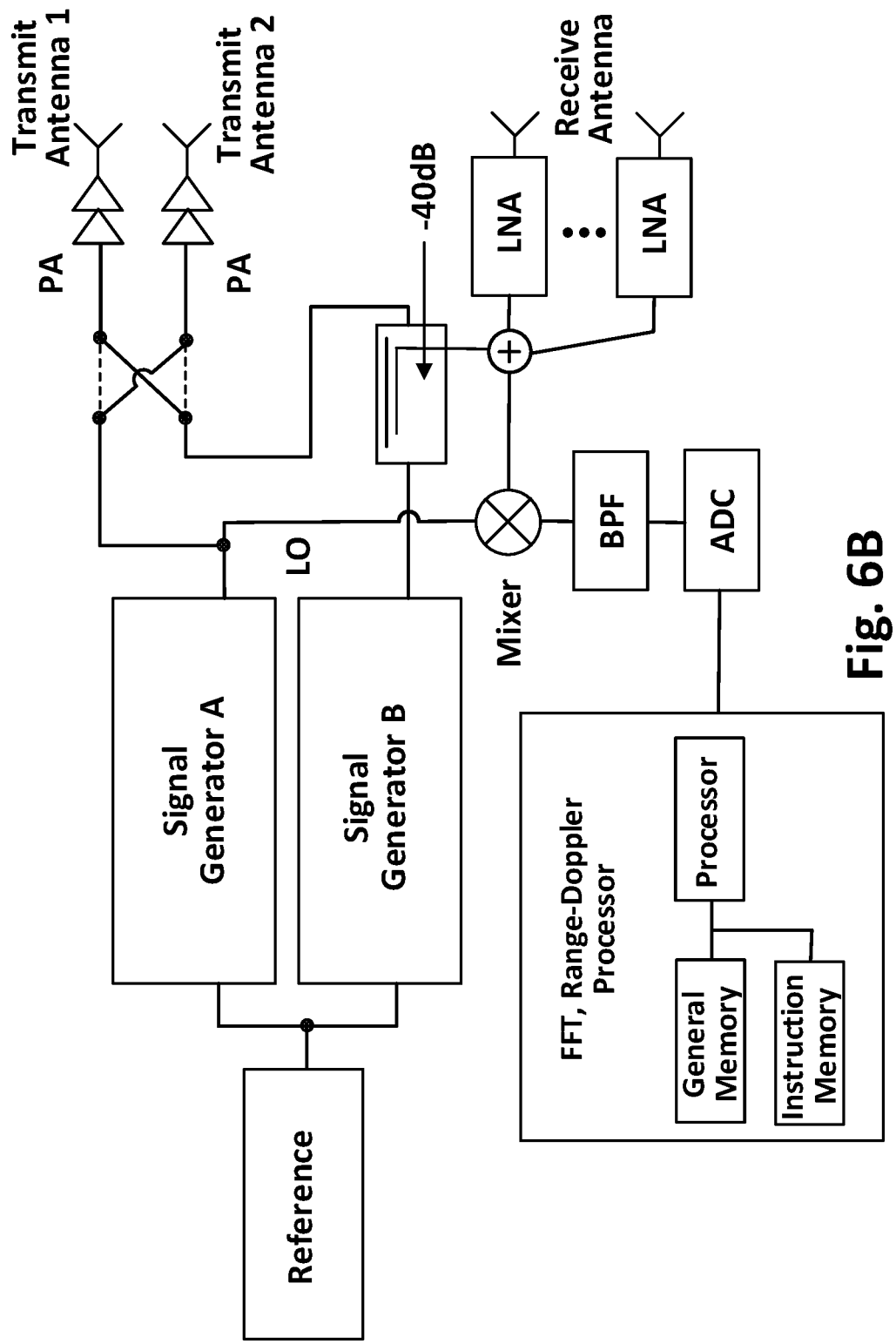
Figure 7A:
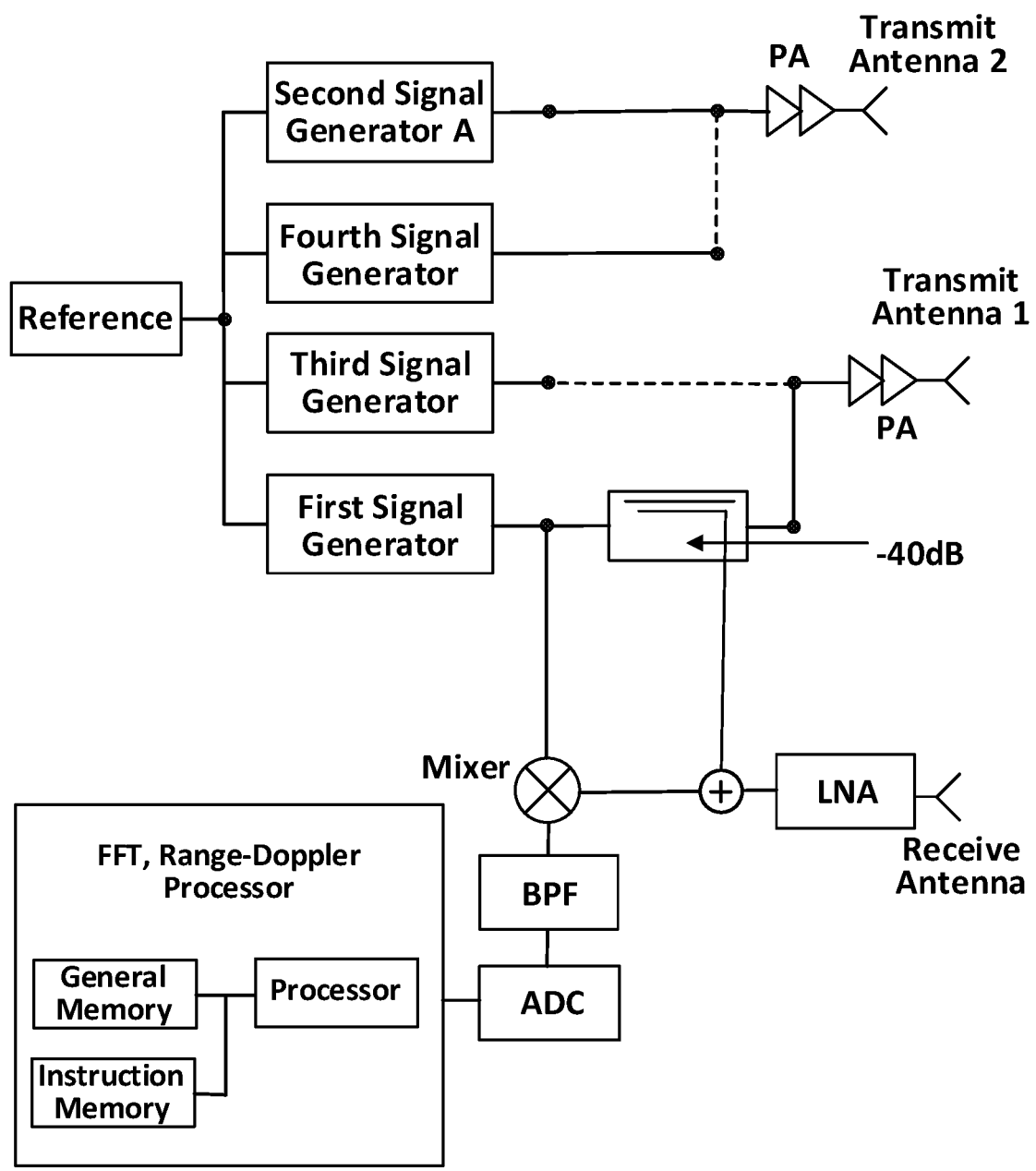
Figure 7B:
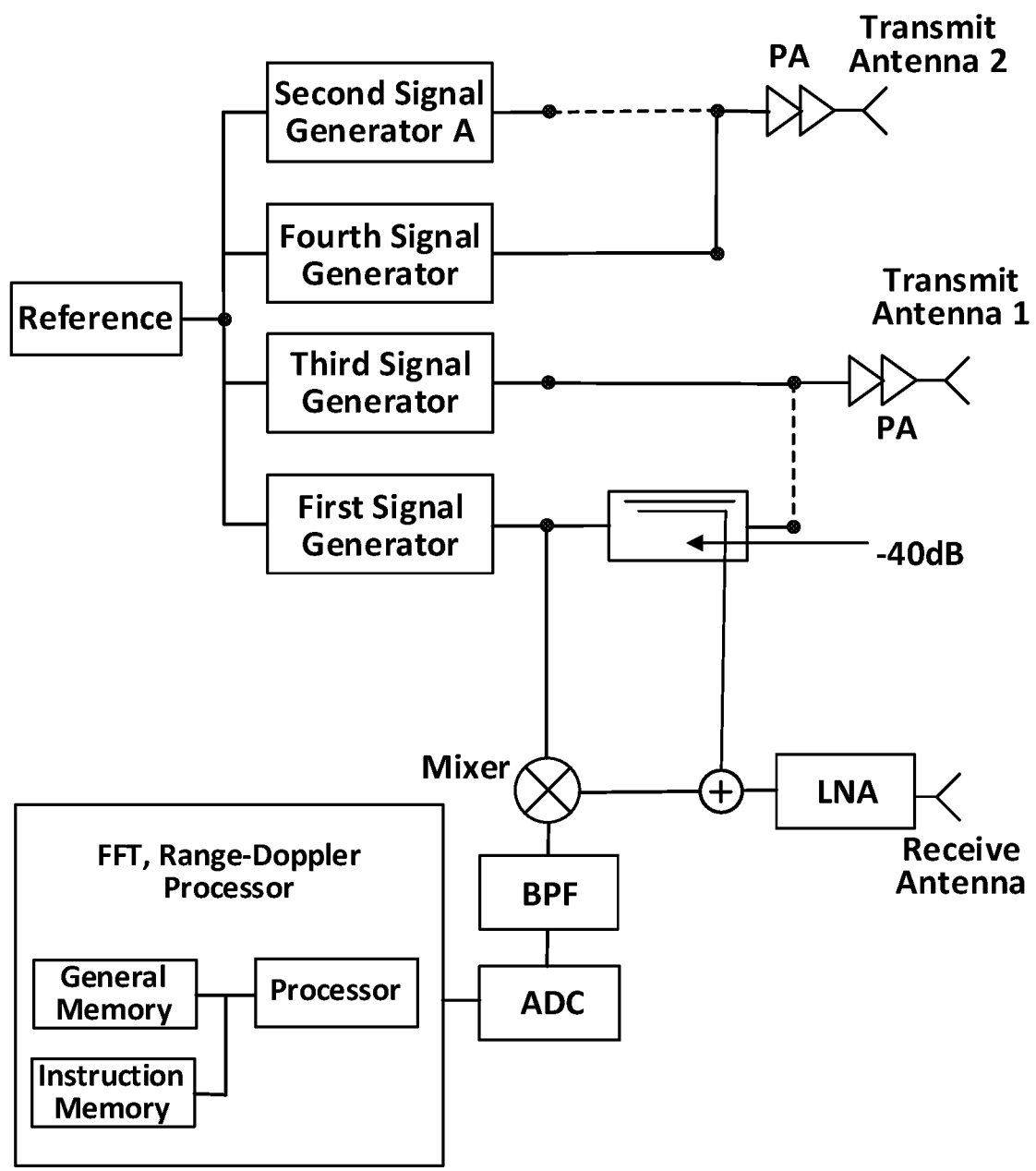

An example of an embodiment of the present invention will be explained in more detail by way of the following drawings. They show:

FIG. 1—a curve progression and schematic evaluation signals for the generation of a range-Doppler matrix by way of two-dimensional FFT in accordance with the prior art, FIG. 2—a signal progression according to a second example of an embodiment of the present invention, FIG. 3—the schematic depiction of the results in a range-Doppler matrix, FIG. 4—the schematic depiction of a circuit for a device according to an example of an embodiment of the present invention, FIG. 5—the schematic depiction of a circuit for device according to another embodiment of the present invention, transmitting different signals from different transmission antennas, FIGS. 6A, 6B—the schematic depiction of a circuit for device according to another embodiment of the present invention, alternating emission of different signals by two antenna, and FIG. 7A, 7B—the schematic depiction of a circuit for device according to another embodiment of the present invention, alternating between a mode of first and second transmission signals and third and fourth transmission signals.

FIG. 1 shows a schematic representation of how a range-Doppler matrix can be calculated. In the upper section of FIG. 1, the solid line indicates the frequency of the transmission signal as a function of time. Ascending ramps are shown, which are run through from a starting frequency, which is the smallest frequency of the ramps, to an end frequency, which is the largest frequency of the ramps. At a slight offset to this, the corresponding received signal is depicted by a dashed line, wherein said received signal is captured by a receiving unit of the device once it has been reflected at the object whose distance and speed are to be determined.

This received signal is mixed with the transmission signal and subsequently subjected to 2D-FFT in order to generate the range-Doppler matrix. Here, as shown in FIG. 1, the first FFT (range FFT) is executed first. This is conducted for each ramp, such that, for example, in the case of the 2L=256 emitted ramps depicted in the upper section of FIG. 1, 2L=256 range FFTs must be carried out.

The ramps are not measured on a continuous basis; rather, they are sampled with k=512 sample values, for instance. For each of these sample values, which corresponds to a certain frequency value within the ramp, the second FFT (Doppler FFT) is conducted. Here, it may be practical to only conduct the second FFT for the distance values that correspond to the distance range of interest.

The result is the range-Doppler matrix shown at the bottom right of FIG. 1, in which frequency peaks at a beat frequency, which generally corresponds to the distance of the object, and a Doppler frequency, which stems from the speed of the object, are applied. This method is known from the prior art.

FIG. 2 depicts the frequency progression in a method according to a first example of an embodiment of the invention. A dot-dashed line and a solid line can be seen, said lines corresponding to the transmission signal A (TransmitSignal A) and the transmission signal B (TransmitSignal B), and thereby to the first transmission signal and the second transmission signal. They are emitted in parallel. This refers to the first transmission signal and the second transmission signal, which, in the present example of an embodiment, are sloping frequency ramps that run parallel to one another. In the present example of an embodiment, the first transmission signal is the signal with the smaller frequency. The frequency ramp begins at the end frequency and slopes until it reaches the starting frequency. Here, the starting frequency is the smallest frequency of a frequency ramp and the end frequency is the largest frequency of a frequency ramp, regardless of whether the cycle of a ramp actually starts or ends at this frequency. Here, fsw determines the frequency deviation, i.e. the difference between end frequency and starting frequency.

In FIG. 2, the second transmission signal is the signal with the larger frequency. The second frequency ramp is a ramp that is at a parallel offset in relation to the first frequency ramp, wherein the second frequency ramp is at a frequency offset df.

The different ramps are sampled with a sampling frequency and a sampling rate shown in the lower section of FIG. 2.

A dashed line and a dotted line represent the respective received signals, which stem from the reflection of the respective transmission signals at the object that is to be detected.

If these signals are mixed with one of the transmission signals and subsequently subjected to the existing evaluation used to calculate a range-Doppler matrix, the result shown in FIG. 3 is produced. The range-Doppler matrix can be seen, said matrix comprising two peaks for the object. In FIG. 3, these two peaks are in the same column as the matrix, such that they have the same or almost the same Doppler frequency. In actual fact, the two Doppler frequencies are slightly different, as the carrier frequencies of the different signals are slightly different. However, given that the Doppler frequency stems from the speed of the object that is to be detected, this difference is very small and not represented in the range-Doppler matrix.

Both peaks are however found in different lines of the matrix, which actually indicates two different distances. However, the distance between the two peaks corresponds exactly to the frequency offset df of the two transmission signals. It is easy to work backwards from this in order to determine the actual distance of the object from the point of measurement.

The range-Doppler matrix in FIG. 3 also features a further peak, which is identified as a reference peak. Said peak emerges when the first transmission signal is mixed with the second transmission signal. In this case, the line of the peak, which corresponds to the frequency difference between the two mixed signals, said frequency difference stemming from the difference in transmission time that occurs due to the distance of the object, is only the frequency offset, thereby indicating a simple control option.

FIG. 4 shows the schematic arrangement of a device for conducting such a method. A reference source, which may be designed to be quartz for example, is used to generate reference signals, which are fed into two digital signal generators. The signal generators are components known from the prior art and as such, a more detailed description is not necessary. The two signal generators generate the transmission signal A and the transmission signal B. Both are sent to the transmitting antenna ("TX-Antenna") and emitted by the same antenna. Alternatively, as shown by FIG. 5, they can also of course be guided to different transmitting antennae, such as transmission signal 1 by transmission antenna A and transmission signal 2 by transmission antenna B, which send out the different signals. As shown by FIGS. 6A and 6B, an alternating emission of the different signals by the two antennae may also occur in this case, switching from one among FIG. 6A and FIG. 6B to the other after every concurrent two-ramp transmission. Another variation of the alternating antenna emission is illustrated by FIGS. 7A and 7B. In the FIG. 7A mode, transmission antenna 1 transmits first transmission signals while transmission antenna 2 transmits second transmission signals. In the FIG. 7B mode, transmission antenna 1 transmits third transmission signals while transmission antenna 2 transmits fourth transmission signals.

The emitted signals are reflected at the object that is to be detected, not depicted in FIG. 4, and captured by the receiving antenna ("RX-Antenna"). In the mixer, the received signals are mixed with the first transmission signals and subsequently guided through a bandpass filter (BPF) and passed on for evaluation. Alternatively, the received signals can of course also be mixed with the second transmission signal. A coupler is also provided, by way of which part of the second transmission signal is fed to the received signal and thus also mixed with the first transmission signal. This produces a reference peak, which is represented in the range-Doppler matrix according to FIG. 3.

The invention claimed is:

1. A method for determining distance and radial speed of an object relative to a measuring point:
  emitting, at the same time, from at least one transmitting antenna, first transmission signals and second transmission signals, the first transmission signals being radar radiation in a form of first frequency ramps, and the second transmission signals being radar radiation in a form of second frequency ramps, wherein the second frequency ramps are different from the first frequency ramps by a frequency offset difference (df),
  receiving, by at least one receiving antenna, received signals which include reflections from the object of the first transmission signals and of the second transmission signals,
  mixing the reflections from the object of the first transmission signals and the reflections from the object of the second transmission signals with one among the first transmission signals and the second transmission signals, creating mixed signals, which include a result of mixing the one among the first transmission signals and second transmission signals with the reflections from the object of the first transmission signals and the reflections from the object of the second transmission signals,
  generating a range-Doppler matrix using a sampling of at least a bandpass filter passband portion of the mixed signals, and a Fourier Transform of the sampling, the range-Doppler matrix including two peaks, one of the two peaks corresponding to the mixing of the reflections from the object of the first transmission signals with the one among the first transmission signals and the second transmission signals, and the other of the two peaks corresponding to the mixing of the reflections from the object of the second transmission signals with the one among the first transmission signals and second transmission signals,
  detecting, based on the two peaks in the range-Doppler matrix, two Doppler frequencies, each of the two Doppler corresponding to the radial velocity of the object, and the two Doppler frequencies differing from one another in correspondence to the frequency offset df, and
  determining the radial speed of the object, based on one or more of the two Doppler frequencies or a phase information of the mixed signals obtained from the one or both of the two peaks, or both.

2. The method according to claim 1, wherein the first frequency ramps and the second frequency ramps are each sloping frequency ramps.

3. The method according to claim 1 wherein the first frequency ramps and the second frequency ramps are parallel frequency ramps.

4. The method according to claim 1, wherein the Fourier Transform includes a two-dimensional Fast Fourier Transform (FFT), comprising a range FFT that generates columns of the range-Doppler matrix and a Doppler FFT across the columns that generates rows of the range-Doppler matrix, wherein df is an integer multiple of f/k, wherein k is a length of the range FFT and f is the sampling frequency.

5. The method according to claim 4, wherein the integer multiple is at least 5.

6. The method according to claim 1 wherein the at least one transmitting antenna comprises a first transmitting antenna and a second transmitting antenna, and the emitting emits the first transmission signals from the first transmitting antenna and, at the same time, emits the second transmission signals from the second transmitting antenna.

7. The method according to claim 6, further comprising alternating between emitting the first transmission signals from the first transmitting antenna at the same time as emitting the second transmission signals from the second transmitting antenna and emitting the first transmission signals from the second transmitting antenna at the same time as emitting the second transmission signals from the first transmitting antenna.

8. The method according to claim 6, further comprising:
   alternating between emitting, at the same time, the first transmission signals from the first transmitting antenna and the second transmission signals from the second transmitting antenna, and emitting, at the same time, third transmission signals from the first transmitting antenna and fourth transmission signals from the second transmitting antenna, wherein the third transmission signals are in a form of third frequency ramps and the fourth transmission signals are in a form of fourth frequency ramps;
   mixing one among the third transmission signals and the fourth transmission signals with the reflections from the object of the third transmission signals and the reflections from the object of the fourth transmission signals, creating the mixed signals to also include additional mixed signals, the additional mixed signals including a result of mixing the one among the third transmission signals and the fourth transmission signals with the reflections from the object of the third transmission signals and the reflections from the object of the fourth transmission signals;
   including in the Fourier Transform for generating the range-Doppler matrix a sampling of at least a bandpass filter passband portion of the additional mixed signals, forming the range-Doppler matrix to include two additional peaks, one of the two additional peaks corresponding to the bandpass filter passband portion of the result of the mixing the reflections from the object of the third transmission signals with the one among the third transmission signals and the fourth transmission signals, and the other of the two additional peaks; and corresponding to the bandpass filter passband portion of the result of the mixing of the reflections from the object of the fourth transmission signals with the one among the third transmission signals and fourth transmission signals;
   detecting, based on the two additional peaks in the range-Doppler matrix, two additional Doppler frequencies, each of the two additional Doppler corresponding to the radial velocity of the object.

9. The method according to claim 8 wherein the third frequency ramp and the fourth frequency ramp are parallel frequency ramps.

10. The method according to claim 1 wherein the emitting includes emitting the first transmission signals and the second transmission signals, at the same time, from one are emitted by a same transmitting antenna.

11. The method according to claim 1 wherein the received signals are received by several receiving antennae.

12. The method according to claim 1, further comprising:
    emitting, at the same time as emitting the first transmission signals and the second transmission signals, third transmission signals in a form of third frequency ramps and fourth transmission signals in a form of fourth frequency ramps, wherein the third frequency ramps are different from the fourth frequency ramps by another df, and are different from the first frequency ramps and the second frequency ramps;
    mixing the reflections from the object of the third transmission signals and the reflections from the object of the fourth transmission signals with one among the third transmission signals and the further transmission signals, creating the mixed signals to also include additional mixed signals, the additional mixed signals including a result of mixing the reflections from the object of the third transmission signals with the one among the third transmission signals and the fourth transmission signals and result of mixing the reflections from the object of the fourth transmission signals with the one among the third transmission signals and the fourth transmission signals;
    including in the Fourier Transform for generating the range-Doppler matrix a sampling of at least a bandpass filter passband portion of the additional mixed signals, forming the range-Doppler matrix to include two additional peaks, one of the two additional peaks corresponding to the bandpass filter passband portion of the result of the mixing the reflections from the object of the third transmission signals with the one among the third transmission signals and the fourth transmission signals, and the other of the two additional peaks corresponding to the bandpass filter passband portion of the result of the mixing of the reflections from the object of the fourth transmission signals with the one among the third transmission signals and fourth transmission signals,
    wherein the detecting is configured to detect four Doppler frequencies, two of the four, based on the two peaks in the range-Doppler matrix, and another two of the four based on the two additional peaks.

13. A device for determining distance and radial speed of an object relative to a measuring point, comprising:
    a first signal generator, coupled to a transmitting antenna or to another transmitting antenna, and configured to generate first transmission signals and to emit the first transmission signals from the transmitting antenna or the other transmitting antenna, the first transmission signals being radar radiation in a form of first frequency ramps;
    a second signal generator, coupled to the transmitting antenna or to the other transmitting antenna, configured to generate second transmission signals and to emit the second transmission signals, from the transmitting antenna or the other transmitting antenna, at the same time as the first signal generator emits the first transmission signals from the transmitting antenna or the other transmitting antenna, the second transmission signals being radar radiation in a form of second frequency ramps, the second frequency ramps differing from the first frequency ramps by a frequency offset difference (df);
    a receiving antenna, configured to receive, as received signals, reflections from the object of the first transmission signals and reflections from object of the second transmission signals;
    a mixer, configured to mix one among the first transmission signals and the second transmission signals with the reflections from the object of the first transmission signals and the reflections from the object of the second transmission signals, creating mixed signals, which include a result of mixing the one among the first transmission signals and the second transmission signals with the reflections from the object of the first transmission signals and of mixing the one among the first transmission signals and the second transmission signals with the reflections from the object of the second transmission signals;

a bandpass filter, configured to pass, as passed mixed signals, a portion of the result of mixing the reflections from the object of the first transmission signals with the one among the first transmission signals and the second transmission signals, and a portion of the result of mixing the reflections from the object of the second transmission signals with the one among the first transmission signals and the second transmission signals;

an analog-to-digital converter (ADC), configured to generate samples of the passed mixed signals;

a digital signal processor, configured to receive the samples of the passed mixed signals, and to:

generate a range-Doppler matrix based on computing a two-dimensional Fast Fourier Transform (FFT) using the samples of the passed mixed signals, the range-Doppler matrix including two peaks, one of the two peaks corresponding to the passed portion of the mixing of the reflections from the object of the first transmission signals with the one among the first transmission signals and second transmission signals, and the other of the two peaks corresponding to the passed portion of the result of mixing the reflections from the object of the second transmission signals with the one among the first transmission signals and the second transmission signals, detect, based on the two peaks in the range-Doppler matrix, two Doppler frequencies, each of the two Doppler corresponding to the radial velocity of the object, and the two Doppler frequencies differing from one another in correspondence to the frequency offset df, and determine the radial speed of the objection, based on one or more of the two Doppler frequencies, or a frequency information of the passed mixed signals obtained from the range-Doppler matrix, or both.

14. The device of claim 13 for determining distance and radial speed of an object relative to a measuring point, wherein the first transmission signals are the one among the first transmission signals and the second transmission signals, and the device further comprises:

a coupler, configured to feed a portion of the second transmission signal to the mixer, wherein the mixer is further configured to mix the portion of the second transmission signals with the first transmission signals, producing a reference signal, and the range-Doppler matrix is further based on samples of the reference signal and includes, corresponding to the reference signals, a reference peak.

* * * * *